Feb. 19, 1924.
H. C. MALLORY
EXPANSIBLE COLLAPSIBLE ELEMENT
Original Filed April 22, 1914
1,484,140
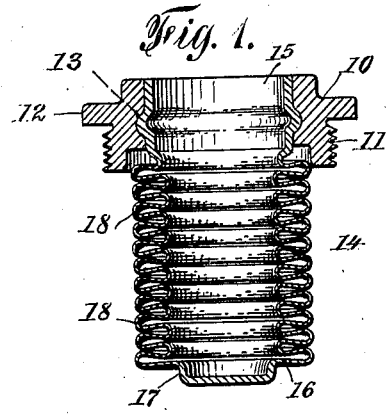
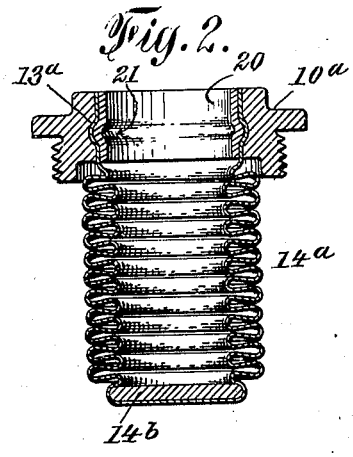
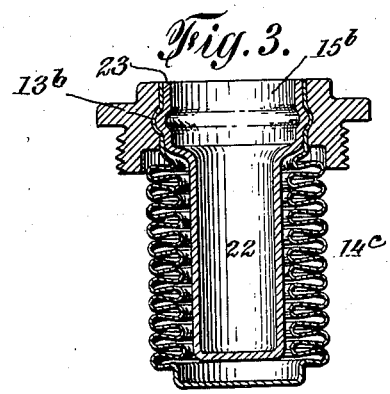
Inventor
Harry C. Mallory
By Conrad A. Deters
his Attorney Patented Feb. 19, 1924.

1,484,140

UNITED STATES PATENT OFFICE.

HARRY C. MALLORY, OF BELLPORT, NEW YORK, ASSIGNOR, BY MESNE ASSIGNMENTS, TO AMERICAN RADIATOR COMPANY, OF CHICAGO, ILLINOIS, A CORPORATION OF NEW JERSEY.

EXPANSIBLE COLLAPSIBLE ELEMENT

Original application filed April 22, 1914, Serial No. 833,593. Renewed December 5, 1919, Serial No. 342,802. Divided and this application filed August 31, 1920. Serial No. 407,209.

*To all whom it may concern:*

Be it known that I, HARRY C. MALLORY, a citizen of the United States, residing at Bellport, Suffolk County, in the State of New York, have invented certain new and useful Improvements in Expansible Collapsible Elements, of which the following is the full, clear, and exact specification.

My invention relates to improvements in methods of making flexible or elastic elements adapted for use in connection with apparatus or devices, subject to or influenced by temperature or pressure variations, whereby to operate a valve or other apparatus or mechanisms.

Further, said invention has for its object to provide a method of making a flexible or elastic element to be interposed between two or more parts of an apparatus or device certain of which are movable with respect to the other thereof, to form a flexible fluid-tight joint yieldingly connecting said parts.

Further, said invention has for its object to provide an expansible-collapsible element of the character specified having means secured thereto whereby said element may be readily and efficiently secured to or within a valve or other part or device in connection with which the same is to be used.

Further, said invention has for its object to provide an expansible-collapsible element having a supporting member secured thereto whereby said element may be readily and efficiently secured within a valve body or other device or part.

Further, said invention has for its object to provide an expansible-collapsible element having a supporting member which serves as a convenient means of attachment to a valve casing, or other device or part, and having means for securing said element to said support which means also serve to reinforce said expansible-collapsible element.

Further, said invention has for its object to provide an expansible-collapsible element having a supporting member secured thereto which serves to form a fluid-tight joint at the junction of said parts, and also serves as a means whereby the element may be readily attached to, or detached from a valve casing, or other device or part in connection with which the same is to be used or of which it forms a part.

Further, said invention has for its object to provide a simple, convenient and inexpensive method of producing an element of the character hereinabove specified.

Other objects will in part be obvious, and in part be pointed out hereinafter.

To the attainment of the aforesaid objects and ends my invention consists in the novel details of construction, and in the combination, connection and arrangement of parts and in the several steps constituting the method hereinafter more fully described, and then pointed out in the claims.

In the accompanying drawings forming part of this specification wherein like numerals of reference indicate like parts, Figure 1 is a central, vertical section showing one form of expansible-collapsible element, and supporting means therefor;

Fig. 2 is a similar view showing a modified construction in which the end of the expansible-collapsible element is secured in position by an annular member which serves also to reinforce the end of said element and to render the joint at the junction of said parts fluid tight, and Fig. 3 is a similar view illustrating a further modification in which the open end of the expansible-collapsible element is secured within a support by the flanged portion of a cylindrical member or closure.

In said drawings 10 designates a support which is herein shown in the form of an annular member having its outer edge screw-threaded at 11, and above said screw-threaded portion with a shoulder 12. The inner side of said member 10 is provided with an annular groove 13. 14 denotes an expansible-collapsible element which is shown as cylindrical in form and provided with an open end 15, and a closed end 16 having a reduced projection or boss 17 extending therefrom. The open end 15 of the element 14 is preferably made of greater thickness than the remainder of the element in order to facilitate the attachment thereof to a support or other part. The body or intermediate portion of the element 15 is circumferentially corrugated to form a series of corrugations or folds 18.

In order to secure the expansible-collapsible element to the support or member 10 it merely becomes necessary to insert the open end 15 into the opening in the annular member 10, as shown at Fig. 1, and then by means of a suitable die, or by pressure, expand or force an annular portion of the closed end 15 into the annular groove 13 in the side of said supporting member 10 whereby said parts will be firmly secured together.

Hereupon the expansible-collapsible element may be inserted into the opening in a valve casing or other device or part and secured in position therein by means of its threaded portion 11 engaging with registering threads in the cooperating part.

In the modified construction shown at Fig. 2, the expansible element 14ª, and the supporting member 10ª are substantially the same as illustrated and described in connection with Fig. 1, except that in the present instance the element 14ª is shown having its side wall and closed end of uniform thickness, and its closed end reinforced by a disk 14ᵇ secured within said closed end. The open end of said element 14ª, which is disposed within the opening in the support 10ª, is secured thereto by a separate annular member 20 having an annular bead 21 formed therein by forcing or expanding the wall of said member 20, and the open end of the element 14ª into the annular groove 13ª provided in the inner side of the opening in said support 10ª.

In the construction illustrated at Fig. 3 the parts are similarly secured together as shown and described in connection with Fig. 3, except that in this form the open end 15ᵇ of the expansible-collapsible element 14ᶜ is closed by a member 22 of smaller diameter than the interior of the element 14ᶜ which extends into the same, and is provided at its open end with a flange 23 which is forced or expanded into the annular groove 13ᵇ of the support 10ᵇ by producing an annular bead in the portion of said element adjacent to its open end.

It will of course be obvious that the providing of the annular support 10, 10ª with screw threads illustrates only one form of attachment, and that the said support with the expansible element carried thereby may be secured in many other ways to, or within a co-operating device or part.

This application is a division of my earlier application Serial No. 833,593 filed April 22, 1914, renewed December 5, 1919, Serial No. 342,802, and patented January 25, 1921, No. 1,366,473.

In this case no claim is made for the process of producing the article herein shown, described and claimed, as said process constitutes the subject-matter of a divisional application, filed January 16, 1924, Serial No. 686,499.

Having thus described my said invention what I claim and desire to secure by Letters Patent is:—

1. A device of the character described comprising an annular support, and an expansible-collapsible element provided with an open end disposed within said support, and said open end secured by pressure into engagement with said support, substantially as specified.

2. A device of the character described comprising an annular support, and an expansible-collapsible element provided with an open end disposed within said support, and said open end expanded into engagement with said support, substantially as specified.

3. A device of the character described comprising a support, an expansible-collapsible element disposed within said support and provided with an open end, and a member disposed within the open end of said expansible-collapsible element to secure said expansible-collapsible element within said support, substantially as specified.

4. A device of the character described comprising a support, an expansible collapsible-element disposed within said support and provided with an open end, and a member disposed within the open end of said expansible-collapsible element serving to reinforce the open end thereof, and to secure said expansible-collapsible element within said support, substantially as specified.

5. A device of the character described comprising an annular support having a groove therein, and an expansible-collapsible element disposed within said annular support having an open end, and a portion of said expansible-collapsible element expanded outwardly into the groove within said support, substantially as specified.

6. A device of the character described comprising a shell having a circumferentially corrugated body portion and a tubular end portion extending therefrom, and a closure for said shell secured along its edge to the tubular end of said shell, substantially as specified.

7. A device of the character described comprising a shell having a circumferentially corrugated body portion and a tubular open end portion extending therefrom, and a closure for said open end having a portion conforming to said tubular end portion and secured thereto, substantially as specified.

8. A device of the character described comprising a shell having a circumferentially corrugated body portion, and a smooth, tubular, open end portion extending therefrom, and a closure for said open end disposed therein comprising a cylindrical member closed at one end and provided at its other end with a tubular portion registering with and secured to the tubular end portion of said shell, substantially as specified.

9. A device of the character described comprising a shell having a circumferentially corrugated body portion, and a smooth, tubular, open end portion extending therefrom, and a closure comprising a cylindrical portion closed at one end and provided at its open end with a tubular portion of greated diameter than said cylindrical portion and secured to the tubular end portion of said shell, substantially as specified.

10. A device of the character described comprising a support having an opening therein, a shell having a circumferentially corrugated body portion and a tubular open end portion extending therefrom adapted to be received by the opening in said support, and a closure for the open, tubular end of said shell, a flange on said closure conforming to, and disposed within the tubular open end of said shell; said flange and the tubular end of said shell being expanded into engagement with the recessed opening in said support, substantially as specified.

11. A device of the character described comprising a support and a circumferentially corrugated shell having one part pressed outwardly into engagement with said support, substantially as specified.

12. A device of the character described comprising a support and a circumferentially corrugated shell having one part of relatively greater thickness, and said relatively thicker part pressed outwardly into engagement with said support, substantially as specified.

13. A device of the character described comprising a support having a circular opening therein provided in its side with an annular groove, a shell having a circumferentially corrugated body portion and a tubular end portion of greater thickness than said body portion disposed within said support, said thicker end portion having an annular part expanded into the annular groove in said support whereby to secure said shell to said support, substantially as specified.

14. A device of the character described comprising a support having a circular opening therein provided in its side with an annular groove, a shell having a circumferentially corrugated body portion and a tubular end portion of greater thickness than said body portion disposed within said support; said thicker end portion having an annular part expanded beyond the outline of said tubular end portion and into the annular groove in said support but within the greater circular outline of said corrugations, whereby to secure said shell to said support, substantially as specified.

Signed at the city of New York, New York County, in the State of New York, this first day of June, one thousand nine hundred and twenty.

HARRY C. MALLORY.

Witnesses:
CONRAD A. DIETERICH,
IRENE V. BANNIN.